United States Patent
Pellillo et al.

(10) Patent No.: US 7,281,597 B2
(45) Date of Patent: Oct. 16, 2007

(54) FUEL TANK PROTECTOR SHIELD

(75) Inventors: Robert Pellillo, Livonia, MI (US); Wei Wang, Westland, MI (US); Kumar Mahadevan, Troy, MI (US); Jiamaw Doong, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 10/904,551

(22) Filed: Nov. 16, 2004

(65) Prior Publication Data

US 2006/0102401 A1    May 18, 2006

(51) Int. Cl.
    B62D 27/02    (2006.01)
(52) U.S. Cl. .................. 180/69.1; 296/204
(58) Field of Classification Search ........... 180/69.1, 180/311, 232, 299, 68.5, 346, 312; 280/781; 296/203.01, 204, 205, 29, 38; 123/195 C
    See application file for complete search history.

(56) References Cited

U.S. PATENT DOCUMENTS

| | | | |
|---|---|---|---|
| 3,779,330 A * | 12/1973 | Longpre | 180/69.1 |
| 3,884,516 A * | 5/1975 | Gallion et al. | 293/120 |
| 4,655,307 A * | 4/1987 | Lamoureux | 180/69.1 |
| 5,366,246 A | 11/1994 | Chen et al. | |
| 5,380,042 A | 1/1995 | Hively et al. | |
| 5,673,940 A | 10/1997 | Gaisford et al. | |
| 5,813,491 A * | 9/1998 | Sato et al. | 180/309 |
| 5,992,926 A * | 11/1999 | Christofaro et al. | 296/204 |
| 6,033,006 A | 3/2000 | Bovellan et al. | |
| 6,202,778 B1 * | 3/2001 | Mistry et al. | 180/69.1 |
| 6,273,486 B1 * | 8/2001 | Ezzat et al. | 296/29 |
| 6,435,577 B1 * | 8/2002 | Renault | 293/120 |
| 6,516,907 B2 * | 2/2003 | Robinson | 180/69.1 |
| 6,726,273 B2 * | 4/2004 | Kruschhausen et al. | 296/204 |
| 6,890,010 B2 * | 5/2005 | Bergman | 293/117 |
| 7,013,951 B2 * | 3/2006 | Bauer et al. | 165/41 |
| 7,055,895 B1 * | 6/2006 | King et al. | 296/204 |
| 2001/0052707 A1 * | 12/2001 | Johnson et al. | 293/120 |
| 2002/0005312 A1 | 1/2002 | Gollungberg | |
| 2002/0050413 A1 * | 5/2002 | Renault | 180/69.1 |
| 2002/0179353 A1 * | 12/2002 | Robinson | 180/69.1 |
| 2006/0102401 A1 * | 5/2006 | Pellillo et al. | 180/69.1 |

FOREIGN PATENT DOCUMENTS

GB    2229681 A  * 10/1990

* cited by examiner

*Primary Examiner*—J. A Shriver
(74) *Attorney, Agent, or Firm*—Fred Owens, Esq.; Dickinson Wright PLLC

(57) ABSTRACT

A shield (20) for an automotive vehicle (10) is provided to lessen the impact force to a foreign body by absorbing energy or converting energy from the foreign body with the shield (20). The shield (20) has a ramped surface (22), an inner surface (24), and a periphery (26) delineating the inner surface (24) from the ramped surface (22). The inner surface (24) is further refined into an upper area (28) and a lower area (30), where a ridge (32) extends from the inner surface (24) portioning the upper area (28) from the lower area (30). At least one rib (34) is connected to the ridge (32) and extends from the inner surface (24), whereby the ridge (32) or the rib (34) may absorb energy or divert direct contact into sliding contact when the ramped surface (22) is impacted by a foreign body reducing the impact force upon the foreign body. Also, a method of using a shield (20) in an automotive vehicle 10 is provided.

6 Claims, 2 Drawing Sheets

FUEL TANK PROTECTOR SHIELD

TECHNICAL FIELD

The present invention generally relates to protector shields for automotive vehicles and, more particularly, to fuel tank protector shield for automotive vehicles.

BACKGROUND OF THE INVENTION

The automotive industry, in order to improve vehicle safety, has developed barrier crash testing as a method by which unanticipated failures to vehicles may be detected. By observing the unanticipated failures, appropriate countermeasure may be taken to improve the robustness of the vehicle thereby eliminating the failure altogether or providing insight to the engineering and design of alternative solutions.

In one such development barrier crash test, it was noted that damage to a fuel-sending unit on a 29-gallon fuel tank was observed. Upon further investigation, it was noted that the mason ring that secures the fuel-sending unit to the fuel tank had impacted a structural cross member during the crash test. The impact of the mason ring with the cross member had the undesirable affect of causing damage to the mason ring. Accordingly, it would be advantageous to reduce the impact force upon the mason ring to an acceptable level should the mason ring be impacted into such a cross member.

A Vehicle Fuel Tank Mounting and Protective Cage is disclosed in U.S. Pat. No. 5,366,246 issued to Chen et al. FIG. 3 discloses a fuel tank secured in place by the nest formed in the mounting and protective cage and held in position by the hold down members. The mounting and protective cage is shown mounted to a vertical surface of a frame rail. However, the mason ring or sending unit of the fuel tank is not protected.

U.S. Pat. No. 6,033,006 title Arrangement In A Fuel System In A Vehicle discloses a shield. During collisions the shield protects a filler cap mounted on a fuel pipe. However, it fails to disclose a shield that can reduce the impact force caused by the impingement of the filler cap into a cross member.

Also, in U.S. Pub. No 2002/0005312 a Fuel Tank for a Heavy Vehicle is disclosed. A recess is provided on the upper side of the tank by which a cover and a tank armature are situated. The recess provides protection from mechanical damages from, for example, a trailer chassis that swings past the recess and just above the cover or the tank armature. However, it also fails to disclose a shield that can reduce the impact force caused by the tank armature into a cross member.

In view of the above, it would be advantageous to reduce the impact force upon the mason ring to an acceptable level should the mason ring be impacted into such a cross member. It would also be beneficial to have a shield that reduces the impact force to a mason ring by using a ramped surface to divert the otherwise direct contract into sliding contact.

SUMMARY OF THE INVENTION

A shield for an automotive vehicle is provided to lessen the impact force to a foreign body by absorbing energy or converting energy from the foreign body when it contacts the shield. The shield reduces the impact force to a body by using crushable ribs or ridges to absorb some of the impact energy. The shield reduces the impact force to a body by using a ramped surface to divert the otherwise direct contact between two members into sliding motion along the ramped surface of the shield.

Briefly, the shield has a ramped surface, an inner surface, and a periphery delineating the inner surface from the ramped surface. The inner surface is further refined into an upper area and a lower area, where a ridge extends from the inner surface portioning the upper area from the lower area. At least one rib is connected to the ridge and extends from the inner surface, whereby the ridge or the rib may absorb energy or divert direct contact into sliding contact when the ramped surface is impacted by a foreign body reducing the impact force upon the foreign body.

Also, a method of using a shield in an automotive vehicle is provided. The method of using a shield in accordance with the present invention upon an automotive vehicle includes: positioning the shield upon a cross member and locating the shield in the dislodgment path between the cross member and a mason ring of a tank; and, attaching the shield to the cross member. Additionally, a method of using a shield may include identifying the dislodgment path and placing the ramped surface of the shield in the dislodgment path. Moreover, an attack angle may be identified allowing for sufficient slope for increase energy diversion by changing direct contact into sliding contact. Furthermore, by selecting the appropriate materials an otherwise metal-to-metal contact may be changed into a plastic-to-metal contact reducing undesirable affects.

DESCRIPTION OF PREFERRED EMBODIMENTS

In the figures, the same reference numbers denote like elements. Embodiments of the present invention are suitable for other like uses. For example, the shield may be positioned upon a floor pan wall, brace, or other member of a vehicle to guard and reduce the impact force that would be sustained to an object had the shield not been present. Also, the way the reduction of force occurs to an object is explained. Accordingly, the following embodiments set out several embodiments of the present invention and a method of use. In particular, one of the embodiments uses the present invention to advantage in reducing the impact force to an object such as a fuel reservoir.

Figure 1:
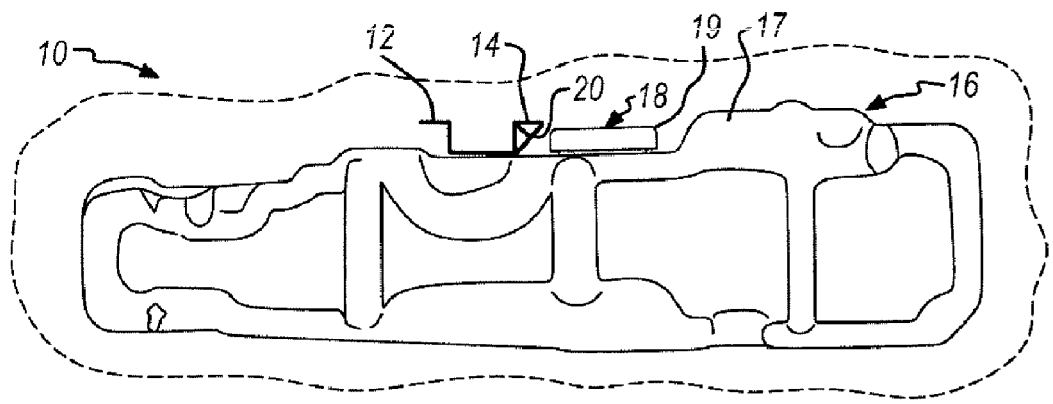
FIG. 1 is a cutaway side view a first embodiment of the shield used in an automotive vehicle to advantage.

FIG. 1 illustrates a cutaway side view a first embodiment of the shield 20 used in an automotive vehicle 10 to advantage. The automotive vehicle 10 includes a cross member 12, a fluid reservoir tank 16 and a shield 20. The inventive shield 20 reduces the impact force to the fluid reservoir tank 16 should the fluid reservoir tank 16 be accelerated toward the cross member 12 or the cross member 12 be accelerated toward the fluid reservoir tank 16.

The cross member 12 has a first side 14 in which the shield 20 may be attached or connected. A person of skill in the art will recognize that the shield 20 may be attached or connected to any of the other sides of the cross member 12, but will be used to advantage if positioned as suggested below.

The fluid reservoir tank 16 has a container 17, a lid 18, and a mason ring 19. The lid 18 is securely sealed to the container 17 by mason ring 19. A person of skill in the art will recognize that the lid 18 and mason ring 19 may be formed from a single material piece. Moreover, the term "mason ring" is used to indicate an item capable of retentively sealing two surfaces together or one other surface to itself, and is not intended to impart any limitation inconsistent with the disclosure herein.

In the present embodiment, the shield 20 is attached to the first side 14 of the cross member 12 and positioned between the mason ring 19 and the cross member 12 in the normal direction of vehicle travel. In this way, the shield 20 may be used to advantage by absorbing energy should the mason ring 19 of the fluid reservoir tank 16 impacts the shield 20. By absorbing energy, the impact force upon the fluid reservoir tank 16 is reduced. The shield 20 may also absorb energy by diverting direct contact with the mason ring 19 into sliding contact along the shield 20.

Figure 5:
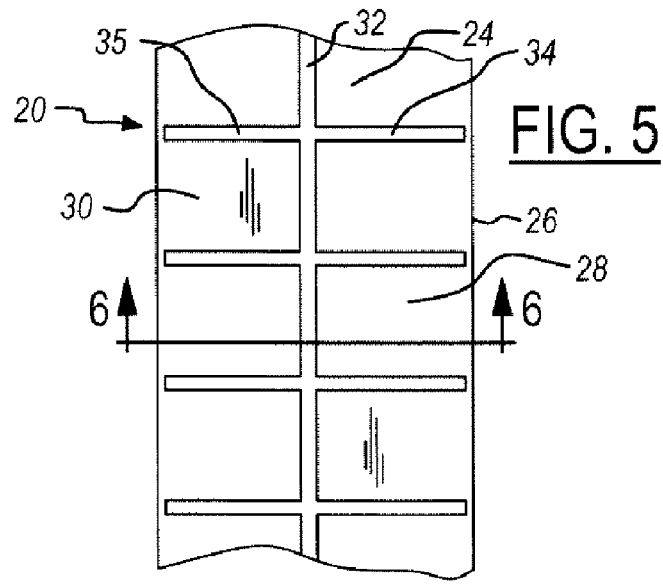
FIG. 5 is a plan view of a first embodiment of the shield shown in FIG. 1.
Figure 6:
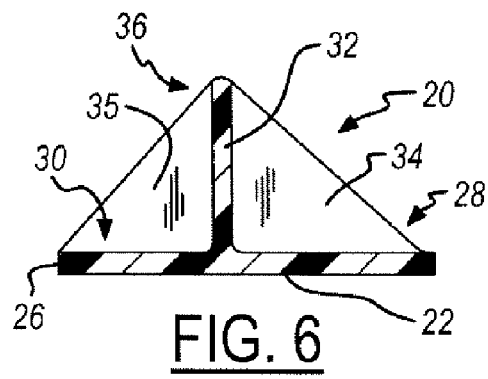
FIG. 6 is a cross section of the first embodiment of the shield shown in FIG. 5.

The shield 20 used to advantage in FIG. 1 is shown in FIGS. 5 and 6. FIG. 5 shows a plan view of the shield 20 and FIG. 6 shows a cross section of the shield 20.

The shield 20 includes a ramped surface 22, an inner surface 24 and a periphery 26. The periphery 26 delineates the inner surface 24 from the ramped surface 22. As shown in the present embodiment, the ramped surface 22, the inner surface 24 and the periphery 26 will form a solid sheet like body.

Alternatively, a void may be formed within the ramped surface 22, the inner surface 24 and the periphery 26.

Returning to the present embodiment, the inner surface 24 of the shield is further divided into an upper area 28 and a lower area 30. The upper area 28 is proportionately larger than the lower area 30. However, a person of skill in the art will recognize that the upper area 28 may be the same or proportionately smaller than the lower area 30.

The shield further includes, a ridge 32 that extends up from the inner surface. In the present embodiment, the ridge 32 portions the upper area 28 from the lower area 30. The ridge 32 extends from the periphery 26 on one side to the periphery 26 on the other side of the inner surface 24.

The shield 20 also includes sets of ribs 34, 35 that are connected to the ridge 32 and extend from the inner surface 24. The set of ribs 34 extend from the ridge 32 and into the upper area 28 of the inner surface 24. The set of ribs 35 extend from the ridge 32 and into the lower area 30 of the inner surface 24. The set of ribs 35 are in line with the set of ribs 34 extending in opposite directs about the ridge 32.

The ribs 34, 35 coupled to the ridge 32 forms a form fitting outer edge 36. The form fitting outer edge 36 of the shield 20 matches the shape of the first side 14 of the cross member 12 and adaptively is fitted to the cross member 12 for attachment. However, alternatively, the ribs and ridge may have another shape and may be form fitting or may not be form fitting.

Alternatively, there may be more than one ridge that extends up from the inner surface 24. Also, there may be more than one rib set extending up from the inner surface 24 and connected to any ridge. Also, there may only be one rib or a second rib that extends from the ridge. A person of skill in the art will recognize that any number of a rib or any number of a ridge will accomplish the inventive aspect for energy absorption or force reduction to a foreign object.

The ridge 32 or the ribs 34, 35 may absorb energy should the ramped surface 22 of the shield 20 be impacted by the mason ring 19 of the fluid reservoir tank 16, thereby reducing the impact force upon the fluid reservoir tank 16. Also, the ramped surface 22 may divert direct contact with the mason ring 19 into sliding contact when the ramped surface 22 is impacted by the mason ring 19, thereby further reducing the impact force upon the fluid reservoir tank 16.

The shield 20 is made from plastic. A person of skill in the art will recognize that the shield may be made from a metal, e.g. aluminum, or any other material suitable to absorbing energy in a force impact application. Moreover, if plastic is used as the material for the ridge 32 or ribs 34,35, the plastic may have a varying density or changing molecular weight enabling the shield 20 to be tuned for a suitable energy absorption rate when impacted by an object.

Figure 2:
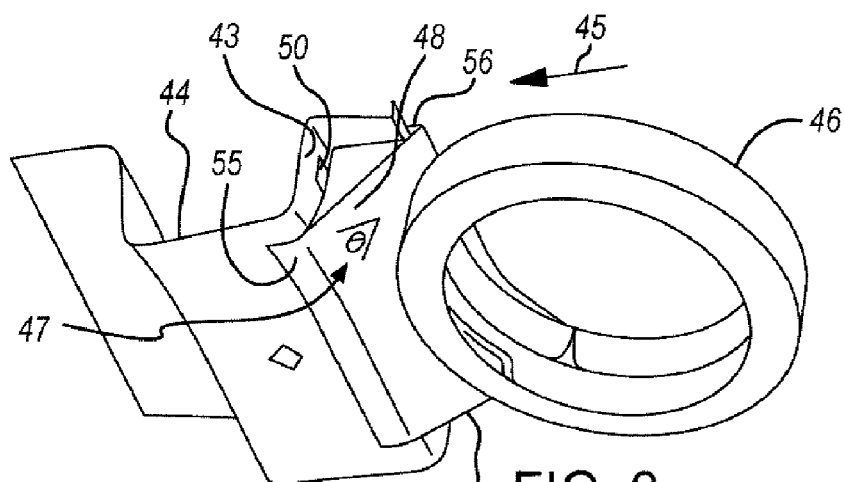
FIG. 2 is a perspective view of a two-dimensional embodiment of a shield being used to advantage.
Figure 3:
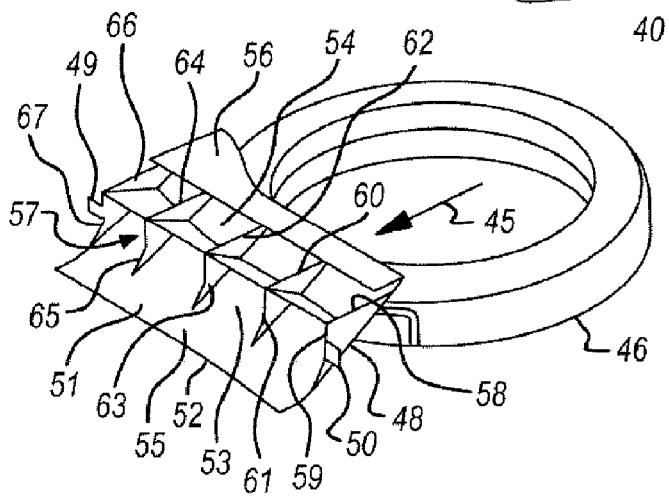
FIG. 3 is a perspective view of a two-dimensional embodiment of a shield being used to advantage.

Referring now to FIG. 2 and FIG. 3, each figure shows a different perspective view of a two-dimensional embodiment of the shield 40 being used to advantage.

The two-dimensional embodiment of the shield 40 illustrates a perspective view of yet another embodiment of the shield 40 used in an automotive vehicle 42 to advantage. The automotive vehicle 42 includes a cross member 44, a mason ring 46 of a tank (not shown) and a shield 40. The inventive shield 40 reduces the impact force to the mason ring 46 should the mason ring 46 with the tank be accelerated toward the cross member 44 in the direction or dislodgement path 45.

The cross member 44 has a first side 43 in which the shield 40 may be attached or connected to the cross member 44 by the tabs 49, 50. A person of skill in the art will recognize that the shield 40 may be attached or connected to any of the other sides of the cross member 44, but will be used to advantage if positioned within the directional path 45.

In the present embodiment, the shield 40 is attached to the first side 43 of the cross member 44 and positioned between the mason ring 46 and the cross member 44 in the normal direction of vehicle travel. In this embodiment, the arrow showing the dislodgement path 45 indicates the normal direction of vehicle travel. This way the shield 40 may be used to advantage by absorbing energy should the mason ring 46 of the tank impacts the shield 40. By absorbing energy, the impact force upon the mason ring 46 is reduced. The shield 40 may also absorb energy by diverting direct contact with the mason ring 46 into sliding contact along the shield 40.

The shield 40 includes a ramped surface 48, an inner surface 51 and a periphery 52. The periphery 52 delineates the inner surface 51 from the ramped surface 48. As represented in the present embodiment, the ramped surface 48, the inner surface 51 and the periphery 52 will form a solid sheet like body.

The inner surface 51 of the shield 40 is further divided into an upper area 54 and a lower area 53. The upper area 54 is proportionately smaller than the lower area 53. However, a person of skill in the art will recognize that the upper area 54 may be the same or proportionately larger than the lower area 53.

The shield 40 further includes, a ridge 57 that extends up from the inner surface. In the present embodiment, the ridge 57 portions the upper area 54 from the lower area 53. The ridge 57 extends from the periphery 52 on one end of the shield 40 to the periphery 52 on the other end of the shield 40.

The shield 40 also includes ribs 58, 59, 60, 61, 62, 63, 64, 65, 66, 67 that are connected to the ridge 57 and extend up from the inner surface 24. The ribs 58, 60, 62, 64, 66 extend from the ridge 57 and into the upper area 54 of the inner surface 51. The ribs 59, 61, 63, 65, 67 extend from the ridge 57 and into the lower area 53 of the inner surface 51. The ribs 58, 60, 62, 64, 66 and the ribs 59, 61, 63, 65, 67, respectively, extend in opposite directions about the ridge 57. Alternately, A person of skill in the art will recognize that any number of a rib or any number of a ridge will accomplish the inventive aspect for energy absorption or force reduction to a foreign object.

The ridge 57 or any of the ribs 58-67 may absorb energy should the ramped surface 48 of the shield 40 be impacted by the mason ring 46, thereby reducing the impact force upon the mason ring 46. Also, the ramped surface 48 may divert direct contact with the mason ring 46 into sliding contact when the ramped surface 48 is impacted by the mason ring 46, thereby further reducing the impact force upon the mason ring 46.

The shield 40 of this embodiment also includes two anchor tabs 49, 50 allowing the shield 40 to be mounted to the cross member 42. A person having skill in the art will recognize that the tabs 49, 50 may each have a bolt extending through the tabs, where the shield 40 may be connected to the first side 43 of the cross member 44 by a nut threaded onto the bolt sandwiching the cross member 44. Optionally, the tabs 49, 50 may be used to affix the shield 40 by gluing, welding, riveting, or other methods of fixing known to those of skill.

A method of using a shield 40 in accordance with the present invention upon an automotive vehicle 42 includes: positioning the shield 40 upon a cross member 44 and locating the shield 40 in the dislodgment path 45 between the cross member 44 and a mason ring 46 of a tank; and, attaching the shield 40 to the cross member 44.

Additionally, a method of using a shield 40 in accordance with the present invention upon an automotive vehicle 42 may include identifying the dislodgment path 45 and placing the ramped surface 48 of the shield 40 in the dislodgment path 45 toward the mason ring 46 of the tank. Moreover, the attack angle 47 may be identified allowing for sufficient slope for increase energy diversion by changing direct contact into sliding contact.

The shield 40 also includes a lip 55 formed in the lower area 53. The lip 55 of this embodiment is formed by the crease in the material, thereby allowing the transition from the ramped surface 48 to the lip 55 to form fit the cross member 44.

The shield 40 also includes a clip 56 formed in the upper area 54. The clip 56 wraps the upper area 54 back toward the ribs 58, 60, 62, 64, 66, thereby allowing the cross member 44 to be clippingly attached between the clip 56 and the ribs 58, 60, 62, 64, 66.

Figure 4:
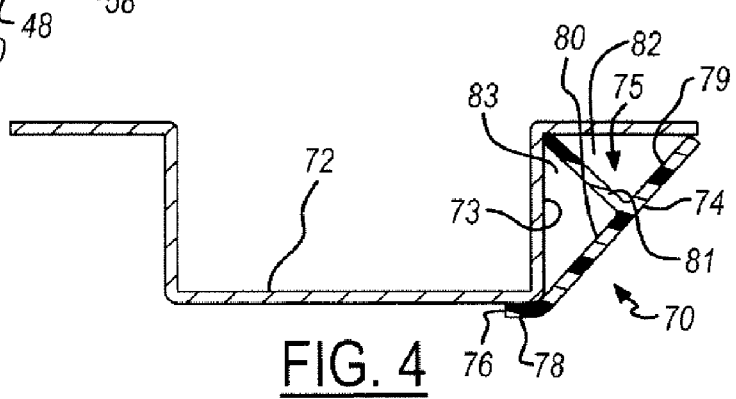
FIG. 4 is a cross sectional view of a second embodiment of the shield being used to advantage.

FIG. 4 is a cross-sectional view of a second embodiment of the shield 70 being used to advantage. The vehicle (not shown) includes a cross member 72, a reservoir 71 and a shield 70. The inventive shield 70 reduces the impact force to the reservoir 71 should the reservoir 71 be accelerated toward the cross member 72 in the direction of the shield 70.

The cross member 72 has a first side 73 in which the shield 70 may be attached or connected to the cross member 72. A person of skill in the art will recognize that the shield 70 may be attached or connected to any of the other sides of the cross member 72, but will be used to advantage if positioned within the directional path as described above.

In the present embodiment, the shield 70 is attached to the first side 73 of the cross member 72 and positioned between the reservoir 71 and the cross member 72 in the normal direction of vehicle travel. The shield 70 may be used to advantage by absorbing energy should the reservoir 71 impact the shield 70. By absorbing energy, the impact force upon the mason reservoir 71 is reduced. The shield 70 may also absorb energy by diverting direct contact with the reservoir 71 into sliding contact along the shield 70.

The shield 70 includes a ramped surface 74, an inner surface 75 and a periphery 76. The periphery 76 delineates the inner surface 75 from the ramped surface 74. As represented in the present embodiment, the ramped surface 74, the inner surface 75 and the periphery 76 will form a solid sheet like body.

The inner surface 75 of the shield is proportioned into an upper area 79 and a lower area 80. The shield 70 also includes a lip 78 formed in the lower area 80. The lip 78 of this embodiment is formed by a fold in the material, thereby allowing the form fitting transition from the ramped surface 74 to the lip 78 allowing abutment to the cross member 72.

The shield 70 further includes, a ridge 81 that extends from the inner surface 75. In the present embodiment, the ridge 81 splits the upper area 79 from the lower area 80. The ridge 81 extends across the inner surface 75 of the shield 70.

The shield 70 also includes ribs 82, 83 that are connected to the ridge 81 and extend up from the inner surface 75. The rib 82 extends from the ridge 81 and into the upper area 79 of the inner surface 75. The rib 83 extends from the ridge 81 and into the lower area 80 of the inner surface 75. The rib 82 and the rib 83 extend in opposite directions about the ridge 81. Alternately, a person of skill in the art will recognize that additional ribs or ridges may be used to accomplish the inventive aspect for energy absorption or force reduction to a foreign object.

The ridge 81 or the ribs 82, 83 may absorb energy should the ramped surface 74 of the shield 70 be impacted by the reservoir 71, thereby reducing the impact force. Also, the ramped surface 74 may divert direct contact with the reservoir 71 into sliding contact should the ramped surface 74 be impacted by the reservoir 71, thereby further reducing the potential impact force.

The shield 70 of this embodiment is attached to the first side 73 of cross member 72 by an adhesive applied to the top edges of the ribs 82, 83, the ridge 81 or the lip 78.

Figure 7:
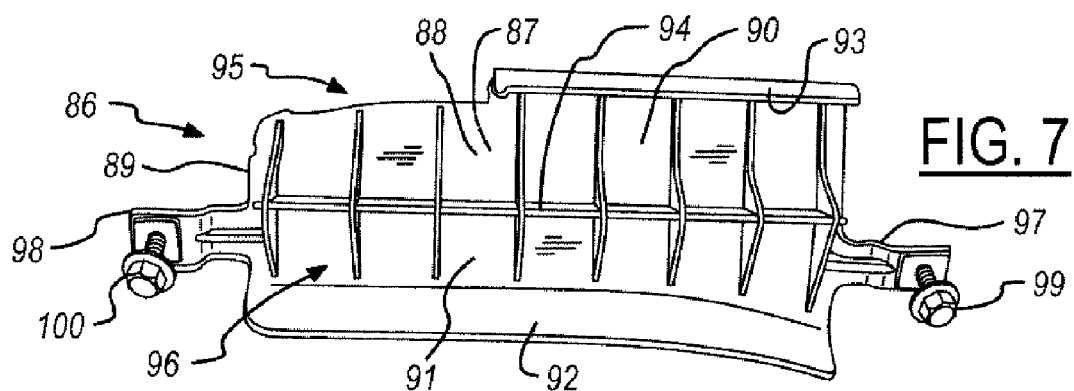
FIG. 7 is a perspective view of a third embodiment of the shield.

FIG. 7 is a perspective view of a third embodiment of the shield 86. The present embodiment of the shield 86 has similarities to the two-dimensional representation of the shield 40 as shown in FIGS. 2 and 3. Moreover, this shield 86 is designed to fit upon a non-uniform cross member of a vehicle.

In the present embodiment, he shield 86 includes a ramped surface 87, an inner surface 88 and a periphery 89. The periphery 89 delineates the inner surface 88 from the ramped surface 87. As represented in the present embodiment, the ramped surface 87, the inner surface 88 and the periphery 89 form a solid body.

The inner surface 88 of the shield 86 is further divided into an upper area 90 and a lower area 91. The shield 86 includes a ridge 94 that extends perpendicularly from the inner surface. In the present embodiment, the ridge 94 approximately proportions the upper area 90 from the lower area 91. The ridge 94 extends from the periphery 89 on one end of the shield 86 to the periphery 89 on the other end of the shield 86.

The shield 86 also includes eight ribs 96. Each rib is connected to the ridge 94 and extends up from the inner surface 88. The ribs 96 extend across the ridge 94 from the upper area 90 to the lower area 91.

The ridge 94, the ribs 96 or the ramped surface 87 may absorb energy should an object impact the shield 86.

The shield 86 of this embodiment also includes two anchor tabs 97, 98 with the bolts 99, 100, respectively attached thereto, allowing the shield 86 to be mounted to a vehicle.

The shield 86 also includes a lip 92 formed in the lower area 91. The shield 86 also includes a clip 93 formed in the upper area 90. The clip 93 wraps the upper area 90 back toward the set of rib 96, thereby forming a grove for clipping to a member.

The shield 86 of the present embodiment is made from a thermoplastic by injection mold process known to a person of skill in the art.

Figure 8:
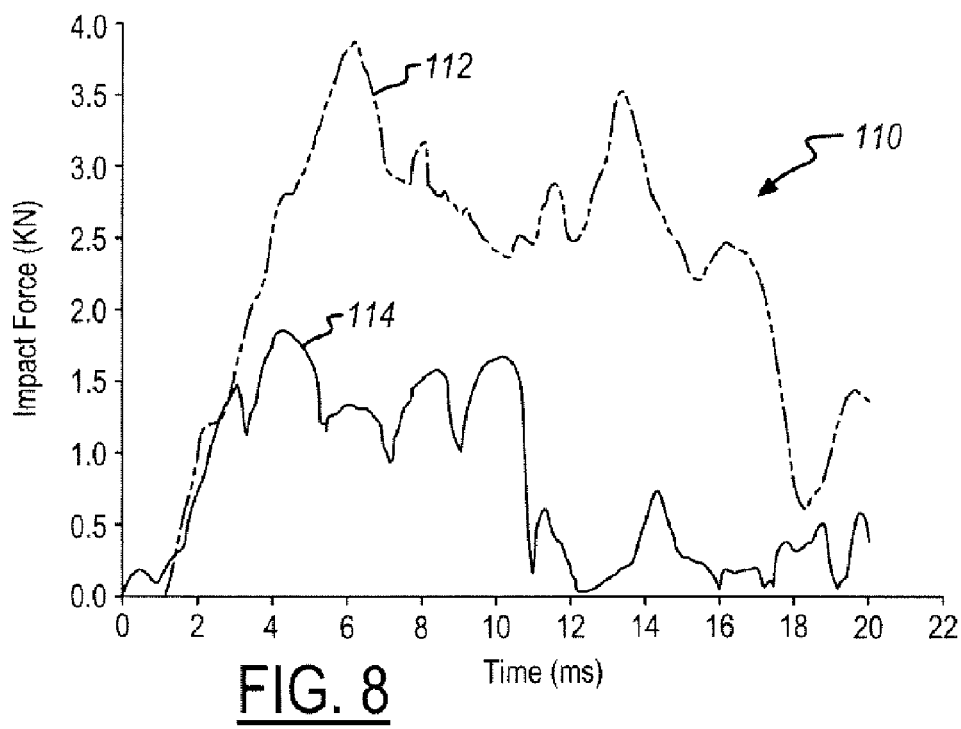
FIG. 8 is a graph showing the reduction in impact force when the present invention is used to advantage.

FIG. 8 is a graph 110 showing the reduction in impact force to the object when the present invention is used to advantage. Specifically, in graph 110 the impact force over time is shown in curve 112. When the object, such as a fluid reservoir tank, impacts a vehicle member, such as a cross member, the resultant force during impact is experienced by the object. The resultant force may damage the object in an unacceptable manner, i.e. damaging the mason ring so that a fluid seal may no longer be maintained by the fluid reservoir tank as shown in FIG. 1.

The second curve 114 represents the impact force to the object when the shield of the present invention is used to advantage. The shield reduces the impact force sustained by the object to an acceptable level, i.e. the object may perform its intended function such as maintaining the seal of a fluid reservoir tank as shown in FIG. 1. The curves 112, 114 were generated by using computer aided engineering component model analysis with the embodiment described in FIGS. 2 and 3.

In several embodiments, the one or more rib has been shown as triangular elements and the one or more ridge has been shown as rectangular elements. However, a person of skill in the art will recognize that the rib or ridge may be made to be form fitting or of other shapes suitable to the particular embodiment to which the shield is used. Moreover, the one or more rib and the one or more ridge have been shown made from a constant thickness, but a person of skill in the art will recognize that a variable thickness may suitable to a particular embodiment.

Also, the ridge of the shield of the several embodiments may have a weep hole (not shown) for draining fluid that has accumulated upon it.

The material used to construct the shield may be such that the ridge or the rib is plastically deformable, whereby energy may be absorbed if a foreign body impacts the ramped surface. The material used to construct the shield may be such that the ridge or the rib is crushably deformable, whereby energy may be absorbed if a foreign body impacts the ramped surface. Also, the optimized rib or ridges may be used to support the ramped surface to avoid bottom-out of the ramped surface against the cross member while sufficiently absorbing impact energy.

Thus, while embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A shield for an automotive vehicle comprising:
a ramped surface;
an inner surface having an upper area and a lower area;
an periphery delineating the inner surface from the ramped surface;
one or more ridge extending from the inner surface and portioning the upper area from the lower area; and
one or more rib coupling the ridge and extending from the inner surface,
whereby one or more of the ridge or the rib may absorb energy when the ramped surface is impacted by a foreign body reducing the impact force upon the foreign body, and whereby the ramped surface may divert direct contact into sliding contact when the ramped surface is impacted by the foreign body further reducing the impact force upon the foreign body; wherein the shield has only one ridge and the ridge extends perpendicularly from the inner surface;
wherein at least a first rib of the one or more rib is a triangular web rib perpendicularly extending from the ridge and the inner surface in the upper area and at least a second rib of the one or more rib is a triangular web rib perpendicularly extending from the ridge and the inner surface in the lower area.

2. A shield for an automotive vehicle comprising:
a ramped surface;
an inner surface having an upper area and a lower area;
an periphery delineating the inner surface from the ramped surface;
one or more ridge extending from the inner surface and portioning the upper area from the lower area; and
one or more rib coupling the ridge and extending from the inner surface,
whereby one or more of the ridge or the rib may absorb energy when the ramped surface is impacted by a foreign body reducing the impact force upon the foreign body, and whereby the ramped surface may divert direct contact into sliding contact when the ramped surface is impacted by the foreign body further reducing the impact force upon the foreign body;
wherein the shield has only one ridge and the ridge extends perpendicularly from the inner surface;
wherein at least a first half of the one or more rib is a set of first triangular web rib, wherein each first triangular web rib perpendicularly extends from the ridge and the inner surface in the upper area, and a second half of the one or more rib is a set of second triangular web rib, wherein each second triangular web rib correspondingly positioned oppositely to a first triangular web rib and perpendicularly extends from the ridge and the inner surface in the lower area, whereby a form fitting outer edge is formed by the composite set of each of the first triangular web rib corresponding to the second triangular web rib.

3. The shield of claim 2 wherein the form fitting outer edge is rectangular, whereby the shield may be fit into any L-shaped channel on the automotive vehicle.

4. A shield for an automotive vehicle comprising:
a ramped surface;
an inner surface having an upper area and a lower area;
an periphery delineating the inner surface from the ramped surface;

one or more ridge extending from the inner surface and portioning the upper area from the lower area; and one or more rib coupling the ridge and extending from the inner surface, whereby one or more of the ridge or the rib may absorb energy when the ramped surface is impacted by a foreign body reducing the impact force upon the foreign body, and whereby the ramped surface may divert direct contact into sliding contact when the ramped surface is impacted by the foreign body further reducing the impact force upon the foreign body;

wherein at least a first half of the one or more rib is a set of first triangular web rib, wherein each first triangular web rib perpendicularly extends from the one or more ridge and the inner surface in the upper area, and a second half of the one or more rib is a set of second triangular web rib, wherein each second triangular web rib correspondingly positioned oppositely to a first triangular web rib and perpendicularly extends from the one or more ridge and the inner surface in the lower area, whereby a form fitting outer edge is formed by the composite set of each of the first triangular web rib corresponding to the second triangular web rib.

5. An automotive vehicle comprising:

a cross member having a first side;

a fluid reservoir tank having a container, a lid, and a mason ring sealingly coupling the lid and the container; and a shield coupled to the first side of the cross member, wherein the shield comprises:

a ramped surface;

an inner surface having an upper area and a lower area;

an periphery delineating the inner surface from the ramped surface;

one or more ridge extending from the inner surface and portioning the upper area from the lower area; and one or more rib coupling the ridge and extending from the inner surface, whereby one or more of the ridge or the rib may absorb energy when the ramped surface is impacted by the mason ring of the fluid reservoir tank reducing the impact force upon the fluid reservoir tank, and whereby the ramped surface may divert direct contact of the mason ring into sliding contact when the ramped surface is impacted by the mason ring further reducing the impact force upon the fluid reservoir tank.

6. The automotive vehicle of claim 5 wherein the shield further comprises one or more anchor tab having a bolt extending there through, wherein the shield may be coupled to the first side of the cross member by a nut threaded onto the bolt sandwiching the cross member.

* * * * *